Aug. 21, 1956
H. C. MUNRO
2,759,769
GARDEN SOAKER HOSE
Filed Aug. 22, 1955
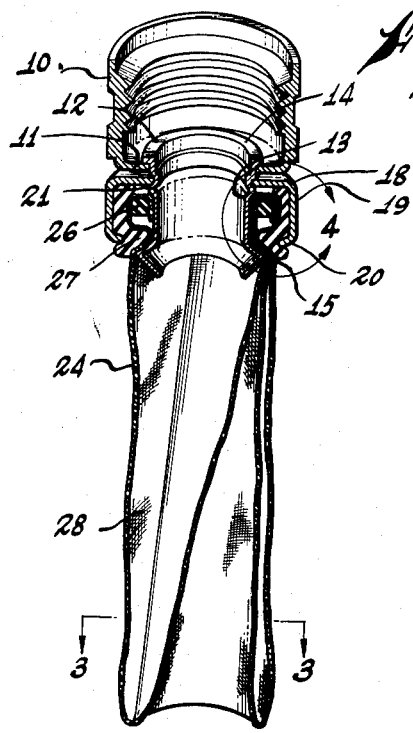
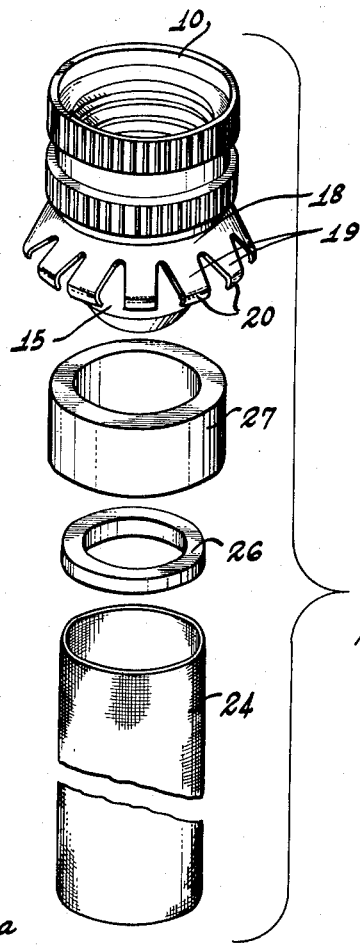
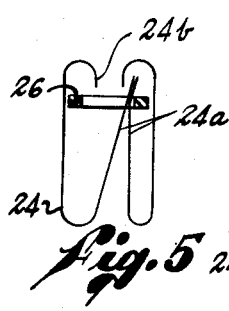
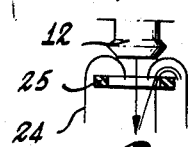
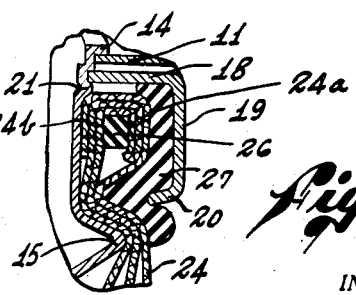
INVENTOR.
HENRIETTA C. MUNRO
BY Fulwider Mattingly & Huntley
Attorneys

United States Patent Office 2,759,769
Patented Aug. 21, 1956

2,759,769
GARDEN SOAKER HOSE

Henrietta C. Munro, Santa Monica, Calif.

Application August 22, 1955, Serial No. 529,787

6 Claims. (Cl. 299—104)

This invention relates generally to a garden soaking device for slowly irrigating the soil without stream turbulence or erosion, and more particularly to an improved soaking attachment which is of simplified and durable construction.

As is well known, when the soil around small garden plants or flowers is to be watered, extreme care must be taken to prevent soil erosion due to the jet effect of the water stream or spray. It is therefore desirable to provide a device which will diffuse the water slowly into the ground without violence. Such a device in order to be practical must be able to withstand the high back pressure in the water system for long periods of time, and be easily connected and utilized in conjunction with existing conventional water systems.

An embodiment of the present invention takes the form of an attachment device for use on the end of conventional garden hose, thus permitting its use at any desired point in the garden. The diffusion member is a flexible perforate sleeve so designed as to provide for a uniform circumferential distribution of water and to prevent a concentration of water pressure at a small area such as would cause blowout or failure of the material. The water diffuses slowly through the sleeve member and may thus soak into the ground without soil erosion. The shape and means of attachment of the diffusion sleeve to the coupling member are of greatest importance if the device is to give durable service, and it is in these features that prior types of garden soaking devices have been most unsatisfactory.

With the foregoing in mind, it is a major object of this invention to provide a garden soaking device which will withstand high water pressure without failure and continue to provide uniform diffusion of water throughout a long service life.

An equally important object of the invention is to provide a garen soaker having diffusion means formed as a tubular perforate sleeve with the outer end turned back through the sleeve and secured at one side of the inner end to close off the sleeve externally and to provide an annular diffusion chamber.

It is also an object of the invention to provide a device of the character described having a coupling member adapted for connection to a hose fitting and assembled with clamping means for securing the diffusion sleeve in place.

These and other objects and advantages of the invention will become apparent from the following detailed description of a preferred form thereof and from an inspection of the accompanying drawings in which:

Figure 1 is a perspective view sectioned longitudinally of the complete device;

Figure 2 is an exploded view showing the various parts of the device;

Figure 3 is a cross section taken along the line 3—3 of Figure 1;

Figure 4 is an enlarged sectional detail taken in the area 4 of Figure 1; and

Figure 5 and Figure 6 are diagrammatic views showing the manner in which the sleeve is clamped in place on the coupling member.

Referring now to the drawings and particularly to Figure 1 thereof, the numeral 10 indicates a female internally threaded coupling member which is adapted for connection on the end of a conventional garden hose and is suitably formed as a metal part. Member 10 has a partial bottom wall 11 and is rotatably connected to a reduced tubular nipple 12 which defines a bore 13 opening downwardly. Nipple 12 is rotatably journaled on member 10 by means of an upper outturned flange 14 which seats on bottom wall 11. If desired, nipple 12 may be formed integrally with member 10 as a single element.

Nipple 12 projects downwardly a considerable distance and on its lower tip end is provided with an outwardly projecting flange 15 which is preferably of raised triangular cross section. Also mounted on nipple 12 just below member wall 11 is a clamping means in the form of a disc 18 provided with a plurality of outer radially projecting prongs 19 which are bendable and are adapted to be bent downwardly and inwardly. Each of the prongs 19 is provided with a lower inturned hook end portion 20 which is shaped for inward gripping engagement. Disc 18 is held against downward movement on nipple 12 by a collar 21 pressed outwardly from the wall of the nipple. As can be understood, the construction is such that water under pressure entering from the garden hose is directed downwardly through member 10, bore 13 and out the lower tip end of nipple 12.

The water diffusion means takes the form of a tubular perforate sleeve 24 which may be made of a strong cloth material such as a woven plastic. The perforations or holes in sleeve 24 are of a small size and the water is discharged therefrom in a fine spray. Thus the ground may be soaked gently without any erosion or channeling from the jet effect of the ordinary water stream. Sleeve 24 provides a large external surface area and it is desirable that the water be discharged therefrom uniformly around the surface. It is also desirable that sleeve 24 be protected against failure from the effect of the back pressure in the water supply system and the dynamic energy of the water caused by its velocity and mass. Finally, it can be appreciated that if the device is to have a long service life, sleeve 24 must be secured firmly to the coupling member and held against separation. These advantages are provided by a novel manner of shaping the sleeve 24 and securing it in place as will be described in some detail.

As will be remembered, sleeve 24 is of tubular shape and is open at both ends before installation. This is, of course, only the initial shape of sleeve 24 as it is necessary to close the bottom of the sleeve so that the discharge water will be forced through the perforations in the sleeve. It has been found that if the sleeve is simply closed at one end the closed end portion must withstand more stress than the remainder of the sleeve and weakens and fails quickly in use. To avoid this the sleeve is turned back through itself to form an annular diffusion chamber wherein stress concentration is decreased. Both the upper and the lower end portions of the sleeve are then secured at one side of nipple 12 in cooperation with a resilient annular washer 26 and an outer annular sealing band 27 which is directly engaged by the clamping prongs 19.

The manner in which sleeve 24 is shaped and secured in position may best be understood by considering the diagrammatic views of Figures 5 and 6. As is seen in Figure 5, the washer 26 is fitted within the top portion of sleeve 24 so that the wall of the sleeve completely surrounds the washer. The bottom end portion of the sleeve, designated 24a, is then turned upwardly through the sleeve and pulled through the internal opening of washer 26 with the entire portion 24a being brought to one side of the washer. The top portion of the sleeve designated 24b is then turned inwardly through the washer opening so that it folds over the bottom portion 24a.

With sleeve 24 so shaped and fitted on washer 26 the assembly is then pushed upwardly over the external surface of nipple 12 as is indicated in Figure 6. As can best be seen in Figure 1, the bottom end of sleeve 24 has thus been completely closed to the passageway 13 through the nipple, and the sleeve itself has been shaped to define a generally annular diffusion chamber 28. The water entering from passageway 13 is forced outwardly through the side wall of the sleeve 24 to diffuse in a uniform fine spray, and since the lower end of the sleeve presents a relative large annular area the effect of high stress concentration is greatly diminished.

In order to secure the sleeve 24 in place the sleeve and washer 26 are forced upwardly past nipple flange 15 and the outer band 27 is slipped over the sleeve so that it fits within the downturned clamping prongs 19. The latter are then pressed inwardly so that gripping ends 20 clench firmly into the band 27 but at the same time do not tear or rip the sleeve 24. The completed clamping assembly is best shown in Figure 4 and as is seen therein both sleeve 24 and washer 26 are held firmly against downward movement by the inward compression of band 27 above flange 15.

While I have thus shown and described in some detail a preferred embodiment of the invention, it will be understood that modifications of design and construction can be made without departing from the scope of the invention. Therefore I do not wish to be limited to the foregoing details except as defined in the appended claims.

I claim:

1. A garden soaking attachment comprising: a coupling member formed at one end for connection to a hose fitting and having a bore therethrough opening outwardly at the opposite end; a tubular diffusion sleeve formed of perforate flexible material, said sleeve having its inner end portion fitted around the end of said member surrounding said bore and the outer end portion turned back through said sleeve and secured under said inner end portion at one side of said bore, whereby said bore is externally closed by said sleeve and water is discharged therefrom into an annular chamber formed by said sleeve for external diffusion; and clamping means fitted around said sleeve for securing said sleeve to said member.

2. A garden soaking attachment comprising: a coupling member formed at one end for connection to a hose fitting and having a bore therethrough opening outwardly at the opposite end; a tubular diffusion sleeve formed of perforate flexible material; a washer of a size to fit around the opposite end of said member surrounding said bore, the inner end portion of said sleeve being fitted around said washer and turned back therethrough and the outer end portion of said sleeve being turned back through said sleeve and secured under the inner end portion at one side of said washer, and said washer and sleeve being fitted over said member, whereby said bore is externally closed by said sleeve and water is discharged therefrom into an annular chamber formed by said sleeve for external diffusion; and clamping means fitted around said sleeve for securing said sleeve and said washer to said member.

3. A garden soaking attachment comprising: a coupling member formed at one end for connection to a hose fitting and having a bore therethrough opening outwardly through a reduced nipple at the opposite end; a tubular diffusion sleeve formed of perforate flexible material, said sleeve having its inner end portion fitted around said nipple and the outer end portion turned back through said sleeve and secured under said inner end portion at one side of said nipple, whereby said bore is externally closed by said sleeve and water is discharged therefrom into an annular chamber formed by said sleeve for external diffusion; and bendable clamping prongs mounted on said member and turned inwardly to secure said sleeve to said member.

4. A garden soaking attachment comprising: a coupling member formed at one end for connection to a hose fitting and having a bore therethrough opening outwardly through a reduced nipple at the opposite end, said nipple having an enlarged flange at its tip end; a tubular diffusion sleeve formed of perforate flexible material; a resilient washer of a size to fit around said nipple, the inner end portion of said sleeve being fitted around said washer and turned back therethrough and the outer end portion of said sleeve being turned back through said sleeve and secured under the inner end portion at one side of said washer and said washer and sleeve being fitted over said nipple, whereby said bore is externally closed by said sleeve and water is discharged therefrom into an annular chamber formed by said sleeve for external diffusion; and clamping means fitted around said sleeve and said washer for holding said washer in place ahead of said flange and securing said sleeve to said member.

5. A garden soaking attachment comprising: a coupling member formed at one end for connection to a hose fitting and having a bore therethrough opening outwardly through a reduced nipple at the opopsite end, said nipple having an enlarged flange at its tip end; a tubular diffusion sleeve formed of perforate flexible material; a resilient washer of a size to fit around said nipple, the inner end portion of said sleeve being fitted around said washed and turned back therethrough and the outer end portion of said sleeve being turned back through said sleeve and secured under the inner end portion at one side of said washer and said washer and sleeve being fitted over said nipple, whereby said bore is externally closed by said sleeve and water is discharged therefrom into an annular chamber formed by said sleeve for external diffusion; and bendable clamping prongs mounted on said member and having hooked end turned inwardly and adapted to be pressed inwardly ahead of said flange for holding said washer in place and securing said sleeve to said member.

6. A garden soaking attachment comprising: a coupling member formed at one end for connection to a hose fitting and having a bore therethrough opening outwardly through a reduced nipple at the opposite end, said nipple having an enlarged flange at its tip end; a tubular diffusion sleeve formed of perforate flexible material; a resilient washer of a size to fit around said nipple, the inner end portion of said sleeve being fitted around said washer and turned back therethrough and the outer end portion of said sleeve being turned back through said sleeve and secured under the inner end portion at one side of said washer and said washer and sleeve being fitted over said nipple, whereby said bore is externally closed by said sleeve and water is discharge therefrom into an annular chamber formed by said sleeve for external diffusion; bendable clamping prongs mounted on said member and having hooked end turned inwardly and adapted to be pressed inwardly ahead of said flange for holding said washer in place and securing said sleeve to said member; and a sealing band of resilient material mounted under said prongs and against said sleeve, said band being deformed inwardly to seal with said sleeve and prevent leakage around said nipple.

References Cited in the file of this patent

UNITED STATES PATENTS

| | | |
|---|---|---|
| 1,254,906 | Henderson | Jan. 29, 1918 |
| 1,989,421 | Robey | Jan. 29, 1935 |
| 2,704,677 | Quest | Mar. 22, 1955 |